United States Patent [19]

Smeggil et al.

[11] 4,451,299

[45] May 29, 1984

[54] HIGH TEMPERATURE COATINGS BY SURFACE MELTING

[75] Inventors: John G. Smeggil, Simsbury; Norman S. Bornstein, West Hartford; Clyde O. Brown, Newington, all of Conn.

[73] Assignee: United Technologies Corporation, Hartford, Conn.

[21] Appl. No.: 421,553

[22] Filed: Sep. 22, 1982

[51] Int. Cl.³ .............................................. C21D 7/00
[52] U.S. Cl. ............................................. 148/1; 148/4; 148/152; 219/121 LM; 427/374.3; 427/380
[58] Field of Search ................................. 428/678–685, 428/939, 941; 427/374.3, 376.8, 380, 319, 320; 219/121 EB, 121 LE, 121 LF, 121 LM; 148/3, 4, 1, 152, 159, 127, 31.5

[56] References Cited

U.S. PATENT DOCUMENTS

| | | | |
|---|---|---|---|
| 3,310,423 | 3/1967 | Ingham, Jr. ........................ | 427/423 |
| 3,928,026 | 12/1975 | Hecht et al. ...................... | 428/660 |
| 3,952,180 | 4/1976 | Gnanamuthu ................. | 219/121 LE |
| 3,957,454 | 5/1976 | Bessen ................................ | 428/660 |
| 4,015,100 | 3/1977 | Gnanamuthu et al. ..... | 219/121 LM |
| 4,122,240 | 10/1978 | Banas et al. ....................... | 143/3 |
| 4,157,923 | 6/1979 | Yen et al. ........................... | 148/159 |
| 4,212,900 | 7/1980 | Serlin ................................. | 219/121 LF |
| 4,323,756 | 4/1982 | Brown et al. ................. | 219/121 LF |

FOREIGN PATENT DOCUMENTS 55-117584  9/1980  Japan ........................... 219/121 LM

OTHER PUBLICATIONS

Jones, H., "Observations on a Structural Transition in Aluminum Alloys Hardened by Rapid Solidification", Mater. Sci. Eng., vol. 5, pp. 1–18 (1969).
Sims, C. T., et al., The Superalloys, J. Wiley & Sons, pp. 596, 597, 598, 599, (1972).

Primary Examiner—Michael L. Lewis
Attorney, Agent, or Firm—Charles E. Sohl

[57] ABSTRACT

The high temperature properties of protective coatings, paricularly the oxidation resistance, is improved by the melting of a surface portion of the coating using a high intensity energy source. The surface melting refines and homogenizes the coating structure, thereby eliminating defects which would otherwise cause premature coating failure.

4 Claims, 5 Drawing Figures

HIGH TEMPERATURE COATINGS BY SURFACE MELTING

DESCRIPTION

1. Technical Field

This invention relates to a process for improving the properties of high temperature coatings through surface melting of a portion of the coating.

2. Background Art

U.S. Pat. No. 3,310,423 describes use of a pulse laser to fuse a plasma spray coating to a substrate. U.S. Pat. No. 3,992,164 describes the fabrication of an internal combustion engine component in which a previously applied coating is fused to a substrate in order to ensure coating adherence.

U.S. Pat. No. 4,015,100 describes a surface alloying technique in which coating is applied to a substrate and then alloyed with the substrate by surface melting. U.S. Pat. No. 4,212,900 also describes a surface alloying technique using surface melting.

U.S. Pat. No. 4,122,240 describes a surface melting process which modifies surface properties as a result of rapid cooling after surface melting.

DISCLOSURE OF INVENTION

This invention relates to a process for improving the resistance of high temperature coatings to environmental attack. Such coatings are widely used, especially in gas turbine engines. Such coatings can be divided into two groups: overlay coatings and diffusion coatings. The overlay coatings consist of a layer of oxidation resistant alloy which is deposited on the surface to be protected. No significant reaction occurs between the substrate and the coating during the deposition process. The diffusion coatings are produced by causing a vapor comprising of aluminum and/or aluminum compounds to react with the surface to be protected to produce an aluminum-rich surface layer. Silicon can also be utilized. Both types of coatings derive their protective capabilities through the formation of an alumina (silica, if silicon is employed in a diffusion coating) scale on the outer surface of the coating. The protective capability of the coating depends upon the perfection of the alumina scale, continuity of the alumina scale, and the adherence of the alumina scale to the substrate.

Both the overlay and diffusion types of coatings present an imperfect surface upon which the formation of a truly uniform continuous adherent alumina layer is difficult. In the case of the overlay coatings, different phases are present in the coating, including the gamma phase, the beta phase, the sigma phase(s) and various carbide phases. Both the gamma and beta phases contain aluminum so that an alumina scale can be developed on these phases. However, these phases have different coefficients of thermal expansion which lead to the rupture of the alumina at the boundary separating the gamma and beta phases in the coating upon thermal cycling. Carbide and sigma phases do not contain aluminum and it is, therefore, impossible to develop an alumina coating in an area where the carbide and sigma phases intersect the surface. Upon exposure to high temperature oxidizing conditions, the sigma and carbide phases will rapidly oxidize and especially in the case of large carbide particles, will produce localized rapid attack which leads to rapid localized coating failure. Analogous problems are present in the case of diffusion coatings. In particular, it is not possible to diffuse aluminum into sigma and carbide phases, and therefore, the sigma and carbide phases are not protected by aluminide coatings and thus, similar coating failures will result in the case of aluminide coatings.

According to the present invention, the performance of high temperature protective coatings is improved by rapid surface melting of a portion of the coatings. Such surface melting may be accomplished by laser, electron beam or similar high energy sources. The surface melting of the coating is accomplished by conditions which result in rapid melting and rapid solidification of the melted portion of the coating. The rapid solidification produces a refined microstructure in which the size of the various phases can be reduced by several orders of magnitude, to a point where they cannot be resolved by optical microscopy. The rapid solidification also produces a supersaturated solid solution, particularly with respect to aluminum. Upon exposure to elevated temperature, the supersaturated surface melted material will produce the desired protective alumina surface layer. Additionally, because of the reduction in size of the deleterious phases, particularly at the scale-metal interface, the problems resulting from presence of sigma and carbides will be substantially eliminated. This desired result can be obtained by melting a portion of the surface coating, preferably from 10–90% of the surface coating, under conditions which result in melting of the coating without vaporization of the coating.

The foregoing, and other features and advantages of the present invention, will become more apparent from the following description and accompanying drawings.

BEST MODE FOR CARRYING OUT THE INVENTION

The protective capabilities of high temperature coatings are enhanced by partial melting of the surface portion of the coating. Such melting can be achieved using a laser electron beam or other apparatus capable of providing an energy density on the order of $10^5$ watts/cm$^2$ of an energy type which may be absorbed by the surface coating to be melted.

An essential part of the present invention is the preheating of the coating to a temperature in excess of its brittle to ductile transformation temperature. If this step is omitted, significant cracking of the coating will occur, rendering it unsuitable for protecting the substrate. For both the overlay and diffusion coatings, this temperature will generally be in the range of 1200° F. (649° C.) to 1500° F. (816° C.).

Overlay coatings to which the present process may be applied include those based on iron, nickel or cobalt or mixtures thereof. These coatings include, but are not limited to, the MCr coatings where chromium ranges from about 20 to about 40%; the MCrAl coatings where chromium ranges from about 15 to about 45% and aluminum ranges from about 7 to about 15%; the MCrAlY coatings where chromium ranges from about 15 to about 45%, aluminum ranges from about 7 to about 20% and yttrium ranges from about 0.1 to about 5%; and the MCrAlHf coatings where chromium ranges from about 15 to about 45%, aluminum ranges from about 7 to about 15% and hafnium ranges from about 0.5 to about 7%. In all of these coatings "M" is selected from the group consisting of nickel, cobalt, iron and mixtures thereof with mixtures of nickel and cobalt being particularly favored. The yttrium (where present) may be partly or wholly replaced by lanthanum, cerium, Misch metal and mixtures thereof. Additionally, up to 10% of a material selected from the group consisting of platinum, rhenium, silicon, tantalum and manganese may be added to any of these coatings.

The diffusion coatings to which the invention may be applied are typified by those described in U.S. Pat. Nos. 3,102,044, 4,005,989, 4,132,816 and 4,326,011. These coatings may be applied in various ways. The overlay coatings can be applied by vapor deposition, plasma spraying, and sputtering. Plasma sprayed coatings will also benefit by the reduction of residual porosity. Diffusion coatings can be applied by slurry coating, pack cementation and vapor techniques.

Figure 1:
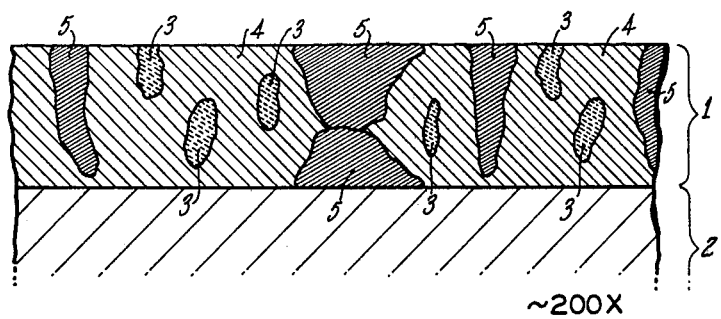
FIG. 1 shows a high temperature coating of the overlay type and illustrates the various phases which can be present.
Figure 2:
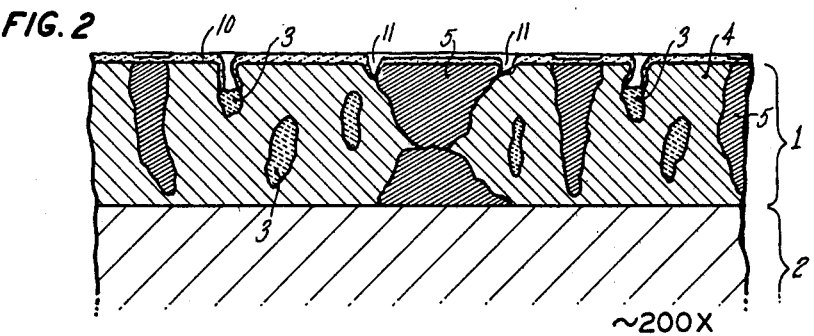
FIG. 2 shows the coating of FIG. 1 after oxidation.

The protective coatings will be applied to a superalloy substrate. FIG. 1 shows in schematic form, a protective coating 1 applied to such a substrate 2 and illustrates the various phases which may be present. Included are carbide phases 3 which may be of a variety of compositions, including $M_{23}C_6$, $M_7C_3$ and MC, where M is a metal which may include molybdenum, tungsten, tantalum, niobium and hafnium, as well as the gamma phase 4, a nickel solid solution containing aluminum, and the beta phase, NiAl. Not specifically illustrated is the sigma phase whose effects are similar to those produced by the carbide phases. FIG. 1 shows the coating as applied; FIG. 2 shows the coating after exposure to elevated temperature oxidizing conditions. As seen in FIG. 2, a protective alumina scale has formed on the gamma and beta phases; the thickness of the layers varies according to the underlying phase. No such scale has formed from the carbide phases and the carbide phases 3 have been partially oxidized, forming flaws in the coating down which oxygen can pass. Also shown in FIG. 2 is some preferential oxidation along the grain boundaries between the gamma and beta phases caused by the difference in thermal expansion between the gamma and beta phases which causes cracking of the protective alumina layer. The detriment caused by the carbide phases and the property differences between the gamma and beta phases, is largely due to the relatively large size of the phases and would not be a problem, for example, if the carbide phases did not extend deeply into the coatings.

Figure 3:
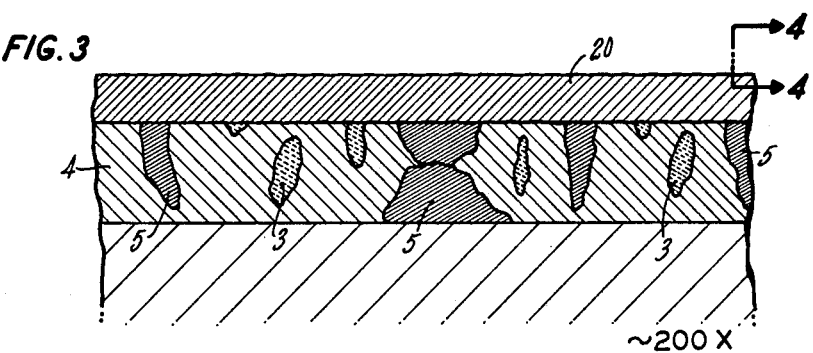
FIG. 3 shows the coating of FIG. 1 after partial surface melting.
Figure 4:
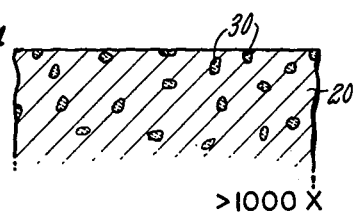
FIG. 4 shows the coating of FIG. 3 at a higher magnitude.

FIG. 3 shows the coating of FIG. 1 after surface melting. The effect of the surface melting is to produce a visually homogeneous surface layer 20 in which the various phases cannot be optically resolved (the secondary phases cannot be optically resolved at a magnification of 1000 times). FIG. 4 shows a high magnification view of a portion of FIG. 3, illustrating the presence of fine carbide, gamma and beta phases, visible only at magnifications greater than 1000 times.

Figure 5:
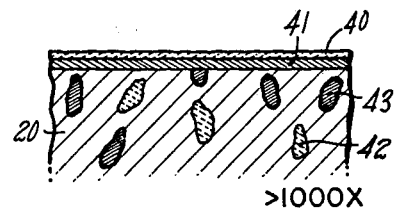
FIG. 5 shows the coating shown in FIG. 4, after oxidation.

FIG. 5 shows the coating of FIG. 4 after high temperature exposure. A uniform alumina scale 40 has formed over a depletion zone 41. The depletion zone 41 is comprised of the gamma phase, formed by outward diffusion of aluminum to form the alumina scale 40. The carbide 42 and beta 43 phases have grown in size, but the protective alumina scale remains intact.

In order to accomplish this result, the coating must be surface melted, preferably to a depth of from about 10-90% of the coating thickness. If less than about 10% of the coating is melted, it may be difficult to ensure that the entire coating surface has been melted, while if greater than about 90% of the thickness is melted, undesirable coating-substrate interactions may occur.

EXAMPLE

A NiCoCrAlY (23% Co, 18% Cr, 12.5% Al, 0.3% Y, balance Ni) coated superalloy sample was surface melted using a laser heat source. Coating thickness was about 6-8 mils. A CW $CO_2$ laser having a 5 KW output power was employed. The laser beam was focused to a 0.125 inch (0.318 cm) beam and scanned over the coating surface at various rates between 1000 and 4000 inches per minute (2540 and 10,160 cm per minute). The interaction times varied from about 0.0019 sec. to about 0.0075 sec. and the depth of melting varied from about 2 to about 5 mils. A sample, part of whose surface had been melted, was oxidation tested at 1000° C. for 100 hours. No quantitative data was obtained because of the short testing time, but is was noted that the untreated coating displayed a mottled, partly blue colored oxide layer (characteristic of cobalt oxide or a spinel) while the surface melted portion displayed a uniform dark grey color indicator of the formation of the desired uniform protective alumina layer.

Although this invention has been shown and described with respect to detailed embodiments thereof, it will be understood by those skilled in the art that various changes in form and detail thereof may be made without departing from the spirit and scope of the claimed invention.

We claim:

1. A method for improving the oxidation resistance of a coated superalloy article which comprises: preheating the article to a temperature above its brittle to ductile transformation temperature, using a concentrated source of heat energy to rapidly melt a portion of the coating so that upon the resultant rapid solidification, a refined super-saturated material, capable of forming a continuous protective oxide scale, results.

2. A method as in claim 1 wherein the melted portion of the coating comprises from about 10% to about 90% of the coating thickness.

3. A method as in claim 1 wherein the coating is an overlay coating.

4. A method as in claim 1 wherein the coating is a diffusion coating.

* * * * *

UNITED STATES PATENT AND TRADEMARK OFFICE
CERTIFICATE OF CORRECTION

PATENT NO. : 4,451,299

DATED : May 29, 1984

INVENTOR(S) : JOHN G. SMEGGIL, NORMAN S. BORNSTEIN and CLYDE O. BROWN

It is certified that error appears in the above-identified patent and that said Letters Patent is hereby corrected as shown below:

In the Abstract, second line, "paricularly" should read

-- particularly --

Column 2, line 67, "40%" should read -- 45% --

Signed and Sealed this

Sixteenth Day of October 1984

[SEAL]

Attest:

GERALD J. MOSSINGHOFF

Attesting Officer

Commissioner of Patents and Trademarks